US009980501B2

(12) United States Patent
Aleid et al.

(10) Patent No.: US 9,980,501 B2
(45) Date of Patent: May 29, 2018

(54) METHOD OF MAKING PROBIOTIC DAIRY PRODUCTS WITH DATE SYRUP ADDITIVE

(71) Applicants: Salah Mohammed Aleid, Alhassa (SA); Fahad Mohammed Al-Jasass, Riyadh (SA); Ahmed Alaa El Din El-Neshwy, Riyadh (SA)

(72) Inventors: Salah Mohammed Aleid, Alhassa (SA); Fahad Mohammed Al-Jasass, Riyadh (SA); Ahmed Alaa El Din El-Neshwy, Riyadh (SA)

( * ) Notice: Subject to any disclaimer, the term of this patent is extended or adjusted under 35 U.S.C. 154(b) by 368 days.

(21) Appl. No.: 14/583,563

(22) Filed: Dec. 26, 2014

(65) Prior Publication Data

US 2016/0183550 A1 Jun. 30, 2016

(51) Int. Cl.

| | |
|---|---|
| ***A23C 9/12*** | (2006.01) |
| ***A23C 19/076*** | (2006.01) |
| ***A23C 19/032*** | (2006.01) |
| ***A23C 9/13*** | (2006.01) |
| ***A23C 9/123*** | (2006.01) |
| ***A23C 9/137*** | (2006.01) |
| ***A23C 9/15*** | (2006.01) |

(52) U.S. Cl.

CPC ........ *A23C 19/0765* (2013.01); *A23C 9/1234* (2013.01); *A23C 9/137* (2013.01); *A23C 9/1307* (2013.01); *A23C 9/1508* (2013.01); *A23C 19/0323* (2013.01); *A23V 2250/5432* (2013.01); *A23Y 2220/15* (2013.01); *A23Y 2240/75* (2013.01); *A23Y 2300/00* (2013.01); *A23Y 2300/45* (2013.01)

(58) Field of Classification Search

CPC ........ A23V 2250/5432; A23C 19/0765; A23C 19/0323; A23C 9/1234; A23C 9/1307; A23C 9/137; A23C 9/1508

USPC ......... 426/34, 36, 40, 42, 43, 573, 576, 580, 426/582, 583

See application file for complete search history.

(56) References Cited

U.S. PATENT DOCUMENTS

| | | | | |
|---|---|---|---|---|
| 2,834,679 | A | 5/1958 | Stoloff | |
| 3,929,892 | A * | 12/1975 | Hynes .................. | A23C 19/076 426/36 |
| 7,959,912 | B2 | 6/2011 | Daube et al. | |
| 2009/0162525 | A1 | 6/2009 | Rivera et al. | |
| 2011/0003034 | A1 | 1/2011 | Netzer | |
| 2014/0087025 | A1* | 3/2014 | Linsenmeier .......... | A23C 9/133 426/61 |

FOREIGN PATENT DOCUMENTS

WO WO 2010/108683 A1 9/2010

OTHER PUBLICATIONS

Tamime et al., Yoghurt Science and Technology, 1985, Pergamon Press, pp. 7, 8, 24, 25, and 261.*

Kosikowski, F., Cheese and Fermented Milk Foods, 1977, 2nd ed., Edwards Brothers, Inc., pp. 159-164, and 603.*

Tamime et al., Yoghurt Science and Technology, 1985, Pergamon Press, pp. 7, 8, 25, 26, and 261.*

* cited by examiner

*Primary Examiner* — Leslie A Wong

(74) *Attorney, Agent, or Firm* — Richard C. Litman

(57) ABSTRACT

The probiotic dairy products with date syrup additives include probiotic yogurts made from both fresh and dried milk, as well as probiotic soft cream cheese. With the addition of date syrup, the probiotic dairy products have increased storage lifetimes, improved textures and tastes, and greater concentrations of probiotic bacterial cultures. The date syrup has a concentration of 5-20 vol %. Optimal results are found for a date syrup concentration of 15 vol %.

9 Claims, No Drawings

METHOD OF MAKING PROBIOTIC DAIRY PRODUCTS WITH DATE SYRUP ADDITIVE

BACKGROUND OF THE INVENTION

1. Field of the Invention

The present invention relates to probiotic foods and the manufacture of dairy products, and particularly to probiotic dairy products with a date syrup additive and a method of manufacturing the same.

2. Description of the Related Art

Probiotics are live microorganisms thought to be beneficial to the host organism. Lactic acid bacteria (LAB) and bifidobacteria are the most common types of microbes used as probiotics; but certain yeasts and bacilli may also be used. Probiotics are commonly consumed as part of fermented foods (such as in yogurt and soy yogurt) with specially added active live cultures, or as dietary supplements. Probiotics are often used to treat or supplement treatments for diarrhea, gastroenteritis, lactose intolerance, colon cancer, high cholesterol levels, high blood pressure, inflammation, irritable bowel syndrome, ulcers and other conditions.

Probiotic yogurt, for example, is a dairy product, and has a very limited storage life. Additionally, maintaining an adequate concentration of bifidobacteria bacteria in the cultured yogurt throughout its stored lifetime is often quite difficult. Similarly, LAB is also difficult to maintain throughout the stored lifetime of the yogurt. It would be desirable to provide an additive to such probiotic dairy products that increases the average storage lifetime of the product, as well as maintaining or increasing the desired probiotic bacterial cultures.

Thus, probiotic dairy products with a date syrup additive solving the aforementioned problems is desired.

SUMMARY OF THE INVENTION

A probiotic dairy product with a date syrup additive is produced by adding a solution gelatin to milk to form a first mixture in which the gelatin is 1% by volume. The first mixture is then heated and rapidly cooled. A 2 vol % yogurt culture is added to the first mixture to form a yogurt mixture, and a 5 vol % probiotic bacterium mixture is added to the yogurt mixture to form a probiotic yogurt mixture. The probiotic yogurt mixture is then incubated until the probiotic yogurt mixture is completely coagulated, forming a curd. The curd is then cooled, and mixed with date syrup. The addition of the date syrup increases the bifidobacteria bacteria and lactic acid bacteria (LAB) in the yogurt product, as well as increasing storage lifetime and enhancing the texture and taste thereof.

In addition to yogurt, a probiotic soft cream cheese may also be produced using a similar method. A volume of milk is first heated, and then about 4 vol % skim milk powder is added to the heated volume of milk to form a first mixture. The first mixture is heated and rapidly cooled. A 0.5 vol % culture is added to the first mixture to form a cultured mixture, and a 5 vol % probiotic bacterium is added to the cultured mixture to form a probiotic cultured mixture. The probiotic cultured mixture is incubated until the probiotic cultured mixture is completely coagulated, forming a curd. The curd is then cooled and mixed with pasteurized fresh cream in a curd:pasteurized fresh cream volume ratio of about 80:20 to form a soft cream cheese. The soft cream cheese is then mixed with pasteurized date syrup.

These and other features of the present invention will become readily apparent upon further review of the following specification.

DETAILED DESCRIPTION OF THE PREFERRED EMBODIMENTS

A first embodiment of the probiotic dairy product with a date syrup additive is produced by adding a solution of gelatin to a volume of milk to form a first mixture that is 1% gelatin by volume. The first mixture is then heated and rapidly cooled. The first mixture is preferably heated at a temperature of about 85° C. for about 10 minutes, and then rapidly cooled to a temperature of about 40° C.

The milk may be either fresh cow milk or dried milk. When fresh cow milk is used, cow milk with about 3 vol % fat content is first heated to a temperature of about 40° C. About 4 vol % skim milk powder is then added to the heated cow milk to form the volume of milk of the first mixture, which is preferably heated to a temperature of about 60° C. prior to the addition of the gelatin. When dried milk is used, whole milk powder is first reconstituted in a volume of potable water having a temperature of about 40° C. to form a milk mixture having about 15 vol % solids. This milk mixture is then heated to about 60° C. to form the volume of milk of the first mixture.

A 2 vol % yogurt culture is added to the first mixture to form a yogurt mixture, and a 5 vol % probiotic bacterium is added to the yogurt mixture to form a probiotic yogurt mixture. The 2 vol % yogurt culture is preferably a mixed culture of a 1:1 ratio of *S. thermophilus* and *L. bulgaricus*. The 5 vol % probiotic bacterium is preferably *Bifidobacterium* infant's, although other bacteria, such as *Bifidobacterium anulatum*, may be utilized. As will be discussed below with regard to experimental testing, *Bifidobacterium infantis* was found to produce optimal results.

The probiotic yogurt mixture is then incubated at a temperature of about 37° C. until the probiotic yogurt mixture is completely coagulated, forming a curd. Typical coagulation time is about eight hours. The curd is then cooled by overnight refrigeration and mixed with about 5-20 vol % date syrup. The addition of the date syrup increases the bifidobacteria bacteria and lactic acid bacteria (LAB) in the yogurt product, as well as increasing storage lifetime and enhancing the texture and taste thereof. As will be discussed below with regard to the experimental results, a concentration of about 15 vol % of the date syrup produces optimal results.

In addition to yogurt, a probiotic soft cream cheese may also be produced using a similar method. Milk (preferably fresh cow milk with a fat concentration of about 3 vol %) is first heated to a temperature of about 40° C., and then about 4 vol % skim milk powder is added to the heated milk to form a first mixture. The first mixture is heated at a temperature of about 85° C. for about 10 minutes, and then rapidly cooled to a temperature of about 40° C.

A 0.5 vol % culture of a 1:1 ratio of *S. thermophilus* and *L. bulgaricus* is added to the first mixture to form a cultured mixture, and a 5 vol % probiotic bacterium is added to the cultured mixture to form a probiotic cultured mixture. The 5 vol % probiotic bacterium is preferably *Bifidobacterium infantis*, although other bacteria, such as *Bifidobacterium anulatum*, may be utilized. As will be discussed below with regard to experimental testing, *Bifidobacterium infantis* was found to produce optimal results.

The probiotic cultured mixture is incubated at a temperature of about 37° C. until the probiotic cultured mixture is completely coagulated, forming a curd. Typical coagulation time is about eight hours. The curd is then cooled and mixed with pasteurized fresh cream (preferably with a fat concentration of about 40 vol %) with a curd:pasteurized fresh cream volume ratio of about 80:20 to form a soft cream cheese. Cooling of the curd is preferably performed by wrapping with cheese cloth and refrigerating for about 24 hours at a temperature between about 3° C. and 5° C.

The soft cream cheese is then mixed with about 10-30 vol % pasteurized date syrup. A pasteurized 15 vol % aqueous gelatin solution is preferably further added, such that the final concentration of gelatin is about 0.75 vol %. The temperatures of both the date syrup and the gelatin solution are preferably adjusted to about 45° C. prior to addition. The ingredients are mixed will using an electrical stirrer for about three minutes to ensure homogenization. As will be discussed below with regard to the experimental results, a concentration of about 15 vol % of the pasteurized date syrup produces optimal results.

For purposes of experimental testing, in the preparation of the yogurts, following inoculation with the 2% yogurt mixed culture, a first sample was inoculated with *Bifidobacterium anulatum* alone, and a second sample was inoculated with *Bifidobacterium infantis* alone. Each of these samples was then divided into five sub-samples, and mixed with date syrup concentrations of 0, 5, 10, 15, and 20 vol %, respectively. 100 mg of each sub-sample was stored in a plastic container for ten days at a temperature of 4±1° C. This sampling and preparation process was applied to the yogurts produced from both fresh cow milk and dried milk.

Similarly, in the preparation of the soft cream cheese, following inoculation with the 0.5% mixed culture, a first sample was inoculated with *Bifidobacterium anulatum* alone, and a second sample was inoculated with *Bifidobacterium infantis* alone. Each of these samples was then divided into six sub-samples, and mixed with date syrup concentrations of 0, 10, 15, 20, 25 and 30 vol %, respectively. 100 mg of each sub-sample was stored in a plastic container for fifteen days at a temperature of 4±1° C.

Samples were withdrawn for chemical, physical, microbiological and sensory evaluation at one, five, ten and fifteen day intervals during the storage period. Three replicates of each sampling and analysis were carried out.

As will be seen in the results below, addition of date syrup to the probiotic yogurt and cheese significantly increased the total solids, total carbohydrates and total calorie contents of the products, and the increase was found to be proportionate to the syrup level. Addition of date syrup and storage slightly increased acidity content and decreased pH values of both yogurts and the cheese. Further, the addition of date syrup to the probiotic yogurt and cheese showed significantly increased bifidobacterial counts in the products and improvement in their viabilities during storage. Lactic acid bacterial counts of the products followed a similar trend.

Further, addition of the date syrup decreased the total bacterial counts of the probiotic cream cheese. Molds, yeasts and coliforms were not detected in any of the products up to the end of the storage period. The lightness values color (L) of the products containing date syrup were decreased, while yellowness and redness values (a, b) were increased. Sensory evaluation indicated that addition of the date syrup significantly improved the overall sensory quality of the products. Although products containing date syrup up to 20 vol % were found to be acceptable, a concentration of 15 vol % gained the highest score. All products remained of acceptable quality up to the end of the storage period at a temperature of 4±1° C. The maximum storage period was 10 days for the yogurts and fifteen days for the soft cream cheese. Products made using a *Bifidobacterium infantis* culture showed significantly higher scores than that made using the *Bifidobacterium angulatum* culture.

Sensory evaluation is a subjective standard, measuring taste, flavor, texture, appearance, color and overall acceptability. Sensory evaluation was tested using ten trained panelists, who used a scale ranging from one to nine on a questionnaire, where one represented an answer to a question of "dislike extremely" and nine represented an answer of "like extremely". For microbiological examination, samples of both yogurts and the soft cream cheese were tested for lactic acid bacteria, coliform, yeast and mold counts. Bifdobacterium counts were determined according to the standard methods of the International Dairy Federation on de Man-Rugosa-Sharpe agar (MRS+0.5 cestein (DIFCO, Heidelberg, Germany) under anaerobic conditions at 37° C. for 3-5 days. Total bacterial counts of the cheese samples were similarly determined. Samples of the probiotic yogurts and the soft cream cheese were examined for color by a conventional laboratory spectrocolorimeter. Samples were further analyzed for total solids, fat, total protein, total carbohydrates, ash acidity and pH values using conventional methods.

For each set of three replicates, three different varying factors were used: refrigerated storage time, concentration of added date syrup, and the type of bacterial culture. The data were statistically analyzed according to the technique of analysis of variance (ANOVA) for the factorial experiment with a completely randomized design. The treatment means were compared using least significant difference (LSD) at the 5% level to examine multiple comparisons between means.

Table 1a below illustrates the effect of date syrup concentration, *bifidobacterium* cultures, and storage period on total solids (TS) and total carbohydrate contents for probiotic yogurt made with fresh milk. Table 1b below illustrates the effect of date syrup concentration, *bifidobacterium* cultures, and storage period on total solids (TS) and total carbohydrate contents for probiotic yogurt made with dried milk. In the following tables, each number is the mean of the corresponding three replicates. Means with different liters in the same column are significantly different ($p<0.05$). The label "NS" represents no significant difference. The label "*" represents a significant difference.

TABLE 1a

Effect of Date Syrup Concentration, *Bifdobacterium* Cultures and Storage Period on Total Solids (TS) and Total Carbohydrate Contents for Yogurts Made with Fresh Milk

| Treatments | Total Carbohydrate % | Total Solids % |
|---|---|---|
| A: Period (days) | | |
| 0 | 9.069 a | 21.12 a |
| 10 | 8.995 a | 20.84 a |
| LSD at 5% | NS | NS |
| B: Culture | | |
| *B. infantis* | 8.907 a | 21.26 a |
| *B. angulatum* | 8.947 a | 20.69 a |
| LSD at 5% | NS | NS |
| C: Date Syrup Concentration (%) | | |
| 0 | 1.793 e | 14.84 e |
| 5 | 5.814 d | 18.38 d |
| 10 | 9.197 c | 20.97 c |

TABLE 1a-continued

Effect of Date Syrup Concentration, *Bifdobacterium* Cultures and Storage Period on Total Solids (TS) and Total Carbohydrate Contents for Yogurts Made with Fresh Milk

| Treatments | Total Carbohydrate % | Total Solids % |
|---|---|---|
| 15 | 12.53 b | 23.52 b |
| 20 | 15.30 a | 27.19 a |
| LSD at 5% | 0.365 | 2.10 |
| D: Interactions | | |
| A × B | * | NS |
| A × C | * | NS |
| B × C | NS | NS |
| A × B × C | NS | NS |

TABLE 1b

Effect of Date Syrup Concentration, *Bifdobacterium* Cultures and Storage Period on Total Solids (TS) and Total Carbohydrate Contents for Yogurts Made with Dried Milk

| Treatments | Total Carbohydrate % | Total Solids % |
|---|---|---|
| A: Period (days) | | |
| 0 | 8.984 a | 20.66 a |
| 10 | 8.738 a | 20.19 a |
| LSD at 5% | NS | NS |
| B: Culture | | |
| *B. infantis* | 8.732 a | 20.15 a |
| *B. angulatum* | 8.889 a | 20.69 a |
| LSD at 5% | NS | NS |
| C: Date Syrup Concentration (%) | | |
| 0 | 1.998 e | 14.49 e |
| 5 | 5.416 d | 17.66 d |
| 10 | 9.589 c | 20.52 c |
| 15 | 11.94 b | 24.18 b |
| 20 | 15.36 a | 25.25 a |
| LSD at 5% | 0.391 | 1.39 |
| D: Interactions | | |
| A × B | NS | NS |
| A × C | NS | NS |
| B × C | NS | NS |
| A × B × C | NS | NS |

The results shown in Tables 1a and 1b indicate that addition of concentrated date syrup significantly ($p<0.05$) increases both the total solids and total carbohydrate contents of probiotic yogurt. This increase is in proportion to the level of the concentration of date syrup.

As date syrup was added to the fresh milk probiotic yogurt concentrations of 5, 10, 15, and 20%, the total solids increased from 14.8% to 18.4, 20.9, 23.5 and 27.2%, respectively. Further, carbohydrates increased from 1.8% to 5.8, 9.2, 12.5, and 15.3%, respectively, when the yogurt was prepared from fresh cow milk. The data indicate that total solids and total carbohydrates of the products made from either fresh or whole dried cow milk did not show marked differences. The type of the probiotic culture did not affect the contents of the resultant probiotic yogurt. Both total solids and total carbohydrate contents of products made either from fresh or dried milk did not significantly change during the storage period. The increase in total solids and total carbohydrate contents in the probiotic yogurt containing date syrup may be due to the higher total solids and carbohydrate contents of the date syrup itself.

Table 2a below illustrates the effect of date syrup concentration, *bifidobacterium* cultures, and storage period on fat and protein contents for probiotic yogurt made with fresh milk. Table 2b below illustrates the effect of date syrup concentration, *bifidobacterium* cultures, and storage period on fat and total protein contents for probiotic yogurt made with dried milk.

TABLE 2a

Effect of Date Syrup Concentration, *Bifdobacterium* Cultures and Storage Period on Fat and Total Protein Content for Yogurts Made with Fresh Milk

| Treatments | Fat % | Total Protein % |
|---|---|---|
| A: Period (days) | | |
| 0 | 3.715 a | 3.716 a |
| 10 | 3.721 a | 3.708 a |
| LSD at 5% | NS | NS |
| B: Culture | | |
| *B. infantis* | 3.719 a | 3.699 a |
| *B. angulatum* | 3.717 a | 3.726 a |
| LSD at 5% | NS | NS |
| C: Date Syrup Concentration (%) | | |
| 0 | 3.858 a | 3.783 a |
| 5 | 3.792 ab | 3.743 ab |
| 10 | 3.713 bc | 3.711 bc |
| 15 | 3.642 cd | 3.689 cd |
| 20 | 3.586 d | 3.635 d |
| LSD at 5% | 0.082 | 0.045 |
| D: Interactions | | |
| A × B | NS | NS |
| A × C | NS | NS |
| B × C | NS | NS |
| A × B × C | NS | NS |

TABLE 2b

Effect of Date Syrup Concentration, *Bifdobacterium* Cultures and Storage Period on Fat and Total Protein Content for Yogurts Made with Dried Milk

| Treatments | Fat % | Total Protein % |
|---|---|---|
| A: Period (days) | | |
| 0 | 3.748 a | 3.790 a |
| 10 | 3.718 a | 3.683 a |
| LSD at 5% | NS | NS |
| B: Culture | | |
| *B. infantis* | 3.740 a | 3.693 a |
| *B. angulatum* | 3.727 a | 3.779 a |
| LSD at 5% | NS | NS |
| C: Date Syrup Concentration (%) | | |
| 0 | 3.879 a | 3.771 a |
| 5 | 3.796 ab | 3.747 ab |
| 10 | 3.742 bc | 3.935 bc |
| 15 | 3.654 cd | 3.633 cd |
| 20 | 3.596 d | 3.594 d |
| LSD at 5% | 0.069 | 0.360 |
| D: Interactions | | |
| A × B | NS | NS |
| A × C | NS | NS |
| B × C | NS | NS |
| A × B × C | NS | NS |

Tables 2a and 2b show the fat and total protein contents of the probiotic yogurts made from fresh and dried milk for all treatments, respectively. The addition of date syrup significantly ($p<0.05$) decreased the fat and protein contents of the products prepared from either fresh or dried milk, and this decrease is in proportion to the concentration of the date syrup. This decrease may be explained on the basis that addition of date syrup resulted in increasing total carbohydrate contents of the products, which, in turn, caused the decrease of both fat and total proteins of the products. Further, date syrup contains low protein content and very low fat content.

Tables 3a and 3b show total calorie content for yogurts made from fresh milk and dried milk, respectively.

TABLE 3a

Effect of Date Syrup Concentration and *Bifdobacterium* cultures on Total Calorie Content for Yogurts Made with Fresh Milk

| Treatments | Total Calories | % Increase |
|---|---|---|
| A: Culture | | |
| *B. infantis* | 85.86 a | 50.30 a |
| *B. angulatum* | 85.88 a | 51.09 a |
| F-test | NS | NS |
| B: Date Syrup Concentration (%) | | |
| 0 | 56.99 e | 0.00 e |
| 5 | 74.14 d | 30.13 d |
| 10 | 87.72 c | 53.97 c |
| 15 | 99.61 b | 74.74 b |
| 20 | 110.9 a | 94.64 a |
| LSD at 5% | 2.04 | 4.09 |
| C: Interactions | | |
| A × B | NS | NS |

TABLE 3b

Effect of Date Syrup Concentration and *Bifdobacterium* cultures on Total Calorie Content for Yogurts Made with Dried Milk

| Treatments | Total Calories | % Increase |
|---|---|---|
| A: Culture | | |
| *B. infantis* | 86.22 a | 46.45 a |
| *B. angulatum* | 87.40 a | 45.55 a |
| LSD at 5% | NS | NS |
| B: Date Syrup Concentration (%) | | |
| 0 | 59.49 e | 0.00 e |
| 5 | 73.53 d | 23.69 d |
| 10 | 89.55 c | 50.62 c |
| 15 | 99.31 b | 67.05 b |
| 20 | 112.2 a | 88.64 a |
| LSD at 5% | 2.91 | 7.18 |
| C: Interactions | | |
| A × B | NS | NS |

The total calorie content of the probiotic yogurts made from the different treatments is presented in Tables 3a and 3b. It should be noted that addition of concentrated date syrup to the probiotic yogurts resulted in a significant increase in the total calorie content of the products. This increase was proportional to the concentration of the added concentrated date syrup. The total calorie content of the probiotic yogurt made from fresh cow milk was increased by 30.13-94.64% when the concentrated date syrup was added from 5-20%, respectively. The corresponding increase values were 23.69-88.64% when the product was made from reconstituted whole dried milk. However, no significant differences were found in the total calories in the products made from the different probiotic cultures.

Tables 4a and 4b illustrate the effect of date syrup concentration, cultures and storage period on changes of acidity (as % lactic acid) and pH of yogurt made from fresh milk and yogurt made from dried milk, respectively.

TABLE 4a

Effect of Date Syrup Concentration, *Bifdobacterium* Cultures and Storage Period on pH and Total Acidity (as % of Lactic Acid) for Yogurts Made with Fresh Milk

| Treatments | pH | Acidity |
|---|---|---|
| A: Period (days) | | |
| 0 | 4.557 a | 0.7367 c |
| 5 | 4.540 ab | 0.7540 b |
| 10 | 4.521 b | 0.7710 a |
| LSD at 5% | 0.028 | 0.0005 |
| B: Culture | | |
| *B. infantis* | 4.536 a | 0.7562 a |
| *B. angulatum* | 4.543 a | 0.7521 a |
| F-test | NS | NS |
| C: Date Syrup Concentration (%) | | |
| 0 | 4.508 b | 0.7672 b |
| 5 | 4.512 b | 0.7661 c |
| 10 | 4.555 a | 0.7683 a |
| 15 | 4.547 ab | 0.7372 d |
| 20 | 4.574 a | 0.7306 e |
| LSD at 5% | 0.036 | 0.0007 |
| D: Interactions | | |
| A × B | NS | NS |
| A × C | NS | NS |
| B × C | NS | NS |
| A × B × C | NS | NS |

TABLE 4b

Effect of Date Syrup Concentration, *Bifdobacterium* Cultures and Storage Period on pH and Total Acidity (as % of Lactic Acid) for Yogurts Made with Dried Milk

| Treatments | pH | Acidity |
|---|---|---|
| A: Period (days) | | |
| 0 | 4.600 a | 0.7223 b |
| 5 | 4.607 a | 0.7477 a |
| 10 | 4.593 a | 0.7590 a |
| LSD at 5% | 0.016 | 0.0163 |
| B: Culture | | |
| *B. infantis* | 4.619 a | 0.732 b |
| *B. angulatum* | 4.581 b | 0.754 a |
| F-test | * | * |
| C: Date Syrup Concentration (%) | | |
| 0 | 4.577 b | 0.7389 a |
| 5 | 4.588 ab | 0.7361 a |
| 10 | 4.602 ab | 0.7544 a |
| 15 | 4.612 ab | 0.7467 a |
| 20 | 4.619 a | 0.7389 a |
| LSD at 5% | 0.036 | 0.0211 |
| D: Interactions | | |
| A × B | NS | NS |
| A × C | NS | NS |
| B × C | NS | NS |
| A × B × C | NS | NS |

As shown in Tables 4a and 4b, the acidity was significantly increased in yogurt made from fresh milk containing 10% date syrup. However, the acidity was significantly decreased in products containing 15% and 20% date syrup. The values of pH were not significantly affected by date syrup addition. Further, the acidity of all yogurt samples showed significant increases during storage period, and this is associated with significant decreases in pH values of the products. Concerning the effect of culture type, it should be noted that no significant effect for culture type on acidity and pH of yogurt made from fresh milk was found, but in the case of dried milk yogurt, the product made using *B. angulatum* showed significantly higher acidity and lower pH than that made using *B. infantis*. The slight increase in acidity of the product containing 10% date syrup may be due to its higher content of simple sugars, which stimulate lactic acid fermentation.

Tables 5a and 5b show the experimental results for bacterial counts for both the yogurt prepared with fresh milk and the yogurt prepared with dried milk, respectively.

TABLE 5a

Effect of Date Syrup Concentration, *Bifdobacterium* Cultures and Storage Period on *Bifdobacterium* and Lactic Acid Bacterial Counts for Yogurts Made with Fresh Milk

| Treatments | Bifidobacteria Counts × $10^7$ CFU/g | Lactic Acid Bacteria Counts × $10^6$ CFU/g |
|---|---|---|
| A: Period (days) | | |
| 0 | 532.4 a | 459.0 a |
| 5 | 403.2 b | 273.1 b |
| 10 | 302.5 c | 186.4 c |
| LSD at 5% | 37.8 | 25.5 |
| B: Culture | | |
| *B. infantis* | 412.8 a | 303.2 a |
| *B. angulatum* | 412.6 a | 309.1 a |
| F-test | NS | NS |
| C: Date Syrup Concentration (%) | | |
| 0 | 341.1 b | 246.3 b |
| 5 | 416.3 a | 320.9 a |
| 10 | 421.2 a | 306.7 a |
| 15 | 418.5 a | 286.7 a |
| 20 | 416.6 a | 303.6 a |
| LSD at 5% | 48.9 | 37.9 |
| D: Interactions | | |
| A × B | NS | NS |
| A × C | NS | NS |
| B × C | NS | NS |
| A × B × C | NS | NS |

TABLE 5b

Effect of Date Syrup Concentration, *Bifdobacterium* Cultures and Storage Period on *Bifdobacterium* and Lactic Acid Bacterial Counts for Yogurts Made with Dried Milk

| Treatments | Bifidobacteria Counts × $10^7$ CFU/g | Lactic Acid Bacteria Counts × $10^6$ CFU/g |
|---|---|---|
| A: Period (days) | | |
| 0 | 487.3 a | 410.7 a |
| 5 | 394.8 b | 265.9 b |
| 10 | 269.9 c | 178.2 c |
| LSD at 5% | 46.4 | 25.4 |
| B: Culture | | |
| *B. infantis* | 429.3 a | 282.3 a |
| *B. angulatum* | 356.7 b | 287.5 a |
| F-test | * | NS |
| C: Date Syrup Concentration (%) | | |
| 0 | 309.1 b | 225.0 b |
| 5 | 390.5 a | 298.6 a |
| 10 | 398.9 a | 287.0 a |
| 15 | 403.3 a | 283.1 a |
| 20 | 413.2 a | 270.9 a |
| LSD at 5% | 59.9 | 32.7 |
| D: Interactions | | |
| A × B | NS | NS |
| A × C | NS | NS |
| B × C | NS | NS |
| A × B × C | NS | NS |

With regard to the bifidobacteria count, the results of Tables 5a and 5b show that addition of date syrup to probiotic yogurt made from fresh or dried milk at levels of up to 20% concentration shows a significant increase in bifidobacterial counts in comparison with control samples (0% concentration). The increase in bacterial counts of fresh milk probiotic yogurt containing date syrup were 22, 23.5, 22.7 and 22.1% over the control sample when date syrup was added at levels of 5, 10, 15 and 20%, respectively. This increase was higher in dried milk probiotic yogurt, which resulted in increases of 26.3, 29.1, 30.5 and 33.7% over the control in the samples containing 5, 10, 15 and 20% date syrup, respectively. It should be noted that the dried milk probiotic yogurt made using the *B. infantis* culture showed significantly higher bifidobacterial counts than that made using the *B. angulatum* culture. The storage period had a significant effect on bifidobacterial counts of the products, whereas counts were decreased with the advance of the storage period for all treatments. It should be noted that the number of the viable bifidobacterial counts for the products of all treatments was higher than the minimum concentration of probiotics required for beneficial effects up to the end of the storage period.

The results also indicated that addition of date syrup had significant effects on lactic acid bacterial counts of the probiotic yogurt of all treatments. The probiotic yogurt containing date syrup with a concentration of up to 20% showed higher lactic acid bacterial counts than those of the control. These results may be due to the presence of simple sugars in date syrup, which may enhance the growth and activity of lactic acid bacteria. The type of *bifido* culture did not show significant effect on lactic acid bacterial counts of either type of yogurt. There was a significant decrease in lactic acid bacterial counts of all treatments with the advance of the storage period. This may be due to the low pH, since coliform could not grow at the pH of yogurt or acidity close to 1%.

Coliform, mold, and yeast counts were not detected in any tested sample on the first day of production, nor during the ten day refrigerated storage period (at 4±1° C.). This may be attributed to the effect of the probiotic cultures, which protect the products from spoilage organisms.

Tables 6a and 6b include the results on color characteristics for both the fresh milk yogurt samples and the dried milk yogurt samples, respectively. In Tables 6a and 6b, lightness is indicated by "L", redness is indicated by "a", and yellowness is indicated by "b".

TABLE 6a

| Effect of Date Syrup Concentration, *Bifdobacterium* Cultures and Storage Period on Color Characteristics for Yogurts Made with Fresh Milk | | | | |
|---|---|---|---|---|
| Treatments | L | a | b | Color Exchange |
| A: Period (days) | | | | |
| 0 | 81.34 a | 2.006 a | 20.76 a | 82.62 a |
| 10 | 82.38 a | 1.807 a | 20.56 a | 82.45 a |
| LSD at 5% | NS | NS | NS | NS |
| B: Culture | | | | |
| *B. infantis* | 81.64 a | 1.827 a | 19.97 a | 82.86 a |
| *B. angulatum* | 82.08 a | 1.985 a | 20.35 a | 82.60 a |
| F-test | NS | NS | NS | NS |
| C: Date Syrup Concentration (%) | | | | |
| 0 | 90.99 a | −0.80 d | 12.96 d | 91.34 a |
| 5 | 84.04 b | 1.29 c | 17.39 c | 85.47 b |
| 10 | 81.28 c | 2.36 b | 21.57 b | 84.17 b |
| 15 | 78.66 d | 3.16 a | 24.40 a | 80.27 c |
| 20 | 74.34 e | 3.53 a | 24.49 a | 76.42 d |
| LSD at 5% | 1.95 | 0.38 | 0.83 | 2.01 |
| D: Interactions | | | | |
| A × B | NS | NS | NS | NS |
| A × C | NS | NS | NS | NS |
| B × C | NS | NS | NS | NS |
| A × B × C | NS | NS | NS | NS |

TABLE 6b

| Effect of Date Syrup Concentration, *Bifdobacterium* Cultures and Storage Period on Color Characteristics for Yogurts Made with Fresh Milk | | | | |
|---|---|---|---|---|
| Treatments | L | a | b | Color Exchange |
| A: Period (days) | | | | |
| 0 | 80.61 a | 1.83 a | 21.73 a | 83.43 a |
| 10 | 81.28 a | 1.97 a | 20.87 a | 83.98 a |
| LSD at 5% | NS | NS | NS | NS |

TABLE 6b-continued

| Effect of Date Syrup Concentration, *Bifdobacterium* Cultures and Storage Period on Color Characteristics for Yogurts Made with Fresh Milk | | | | |
|---|---|---|---|---|
| Treatments | L | a | b | Color Exchange |
| B: Culture | | | | |
| *B. infantis* | 81.68 a | 1.88 a | 21.54 a | 84.49 a |
| *B. angulatum* | 80.21 a | 1.92 a | 21.06 a | 32.92 a |
| F-test | NS | NS | NS | NS |
| C: Date Syrup Concentration (%) | | | | |
| 0 | 89.60 a | −0.54 d | 17.08 d | 90.84 a |
| 5 | 84.45 b | 1.41 c | 19.56 c | 86.71 b |
| 10 | 80.74 c | 2.27 b | 21.78 b | 83.67 c |
| 15 | 76.80 d | 3.11 a | 24.01 a | 80.34 d |
| 20 | 73.13 e | 3.27 a | 24.06 a | 76.98 e |
| LSD at 5% | 2.49 | 0.46 | 1.96. | 2.49 |
| D: Interactions | | | | |
| A × B | NS | NS | NS | NS |
| A × C | NS | NS | NS | NS |
| B × C | NS | NS | NS | NS |
| A × B × C | NS | NS | NS | NS |

The data given in Tables 6a and 6b indicates that the addition of concentrated date syrup significantly decreased the lightness (L) and color exchange of the products, and this was in proportion to the date syrup concentration. However, both values for redness (a) and yellowness (b) were significantly increased due to the addition of the date syrup. These results may be due to the natural brown color of the date syrup. It should also be noted that the type of milk and type of probiotic cultures did not show significant effects on color characteristics of the yogurts. Moreover, the color characteristics of the yogurt samples did not show significant changes during the cold storage period of up to ten days.

Tables 7a and 7b show the sensory results for yogurt samples made with fresh milk and dried milk, respectively. Trained panelists ranked taste, aroma, texture, appearance, color and overall acceptability for each sample, with an integer rating scale from one to nine.

TABLE 7a

| Effect<br>Table 7: Effect of Date Syrup Concentration, *Bifdobacterium* Cultures and Storage Period on Sensory Evaluation for Yogurts Made with Fresh Milk | | | | | | |
|---|---|---|---|---|---|---|
| Treatments | Taste | Aroma | Texture | Appearance | Color | Overall Acceptability |
| A: Period (days) | | | | | | |
| 0 | 7.690 a | 7.220 a | 7.700 a | 7.413 a | 7.713 a | 7.607 a |
| 5 | 7.637 a | 7.260 a | 7.570 a | 7.343 a | 7.350 b | 7.633 a |
| 10 | 7.407 b | 7.157 a | 7.390 b | 7.253 a | 7.313 b | 7.487 a |
| LSD at 5% | 0.198 | 0.160 | 0.140 | 0.167 | 0.094 | 0.053 |
| B: Culture | | | | | | |
| *B. infantis* | 7.809 a | 7.329 a | 7.689 a | 7.451 a | 7.662 a | 7.656 a |
| *B. angulatum* | 7.347 b | 7.096 b | 7.418 b | 7.222 b | 7.256 b | 7.496 b |
| F-test | * | * | * | * | * | * |
| C: Date Syrup Concentration (%) | | | | | | |
| 0 | 6.756 c | 6.361 c | 6.811 c | 6.489 c | 6.722 d | 6.733 c |
| 5 | 7.889 a | 7.606 a | 7.822 a | 7.656 a | 7.856 a | 7.928 a |
| 10 | 7.933 a | 7.522 a | 7.389 a | 7.717 a | 7.822 a | 7.922 a |
| 15 | 7.722 ab | 7.389 ab | 7.689ab | 7.539 a | 7.561 b | 7.906 a |

TABLE 7a-continued

Effect
Table 7: Effect of Date Syrup Concentration, *Bifdobacterium* Cultures and Storage Period on Sensory Evaluation for Yogurts Made with Fresh Milk

| Treatments | Taste | Aroma | Texture | Appearance | Color | Overall Acceptability |
|---|---|---|---|---|---|---|
| 20 | 7.589 b | 7.183 b | 7.606 b | 7.283 b | 7.333 c | 7.389 b |
| LSD at 5% | 0.256 | 0.207 | 0.181 | 0.216 | 0.121 | 0.195 |
| D: Interactions | | | | | | |
| A × B | NS | NS | NS | NS | NS | NS |
| A × C | NS | NS | * | NS | * | NS |
| B × C | NS | * | NS | NS | * | * |
| A × B × C | NS | NS | * | NS | NS | NS |

TABLE 7b

Effect of Date Syrup Concentration, *Bifdobacterium* Cultures and Storage Period on Sensory Evaluation for Yogurts Made with Dried Milk

| Treatments | Taste | Aroma | Texture | Appearance | Color | Overall Acceptability |
|---|---|---|---|---|---|---|
| A: Period (days) | | | | | | |
| 0 | 7.920 a | 7.637 a | 7.990 a | 7.837 a | 7.570 a | 7.940 a |
| 5 | 7.780 b | 7.500 b | 7.803 b | 7.673 b | 7.347 b | 7.877 a |
| 10 | 7.660 c | 7.373 c | 7.627 c | 7.533 c | 7.087 c | 7.873 a |
| LSD at 5% | 0.113 | 0.089 | 0.111 | 0.121 | 0.156 | 0.117 |
| B: Culture | | | | | | |
| *B. infantis* | 7.831 a | 7.576 a | 8.004 a | 7.562 b | 7.558 a | 7.773 a |
| *B. angulatum* | 7.742 a | 7.431 b | 7.609 b | 7.800 a | 7.111 b | 7.824 a |
| F-test | NS | * | * | * | * | NS |
| C: Date Syrup Concentration (%) | | | | | | |
| 0 | 7.311 d | 7.000 b | 7.378 c | 7.244 d | 7.294 a | 7.244 d |
| 5 | 8.078 a | 7.578 a | 7.967 a | 8.011 a | 7.411 a | 8.011 a |
| 10 | 8.100 a | 7.667 a | 7.956 a | 8.000 a | 7.389 a | 8.000 a |
| 15 | 7.867 b | 7.683 a | 7.972 a | 7.706 b | 7.367 a | 7.706 b |
| 20 | 7.578 c | 7.589 a | 7.761 b | 7.444 c | 7.211 a | 7.444 c |
| LSD at 5% | 0.146 | 0.115 | 0.143 | 0.156 | 0.203 | 0.156 |
| D: Interactions | | | | | | |
| A × B | NS | NS | NS | NS | NS | NS |
| A × C | NS | NS | NS | NS | NS | NS |
| B × C | * | * | * | NS | * | NS |
| A × B × C | NS | NS | NS | NS | NS | NS |

Tables 7a and 7b show the average ratings of the sensory evaluations for each sample. The data indicates that the addition of date syrup results in a significant improvement of the sensory properties of the products prepared from either fresh cow milk or dried milk using the two cultures. The products containing date syrup of up to 20% concentration show significantly higher scores than those of the control sample. The highest scores for all sensory characteristics of the products appear for date syrup concentrations of 15%.

The scores for overall acceptability were 6.7, 7.9, 7.9, 7.9 and 7.4 for fresh milk probiotic yogurt containing 0, 5, 10, 15 and 20% date syrup, respectively. The corresponding values for the dried milk probiotic yogurt were 7.2, 8.0, 8.0, 7.7 and 7.4, respectively. On the other hand, it can be seen that products made using *Bifidobacterium infantis* culture showed significantly higher scores than that made using *Bifidobacterium angulation* culture. Further, the products made from either fresh or dried milk showed good overall acceptable quality up to the end of the ten day storage period, whereas the storage period did not show a significant effect on the acceptability of the products. Additionally, products made from fresh milk showed relatively slight higher scores than those associated with the dried milk yogurt.

Table 8 below illustrates the effect of date syrup concentration, *bifidobacterium* cultures, and storage period on total solids (TS) and total carbohydrate contents for the probiotic soft cream cheese.

TABLE 8

Effect of Date Syrup Concentration, *Bifdobacterium* Cultures and Storage Period on Total Solids (TS) and Total Carbohydrate Contents for Probiotic Soft Cream Cheese

| Treatments | Total Carbohydrate % | Total Solids % |
|---|---|---|
| A: Period (days) | | |
| 0 | 9.686 a | 42.77 c |
| 5 | 9.540 a | 43.11 bc |
| 10 | 9.542 a | 43.46 ab |
| 15 | 9.336 a | 43.78 a |
| LSD at 5% | 0.346 | 0.35 |
| B: Culture | | |
| *B. infantis* | 9.333 a | 43.168 a |
| *B. angulatum* | 9.318 a | 43.394 a |
| LSD at 5% | NS | NS |
| C: Date Syrup Concentration (%) | | |
| 0 | 2.653 f | 39.40 f |
| 10 | 5.741 e | 41.23 e |
| 15 | 8.535 d | 42.43 d |
| 20 | 10.82 c | 43.89 c |
| 25 | 13.48 b | 45.27 b |
| 30 | 15.92 a | 47.45 a |
| LSD at 5% | 0.423 | 0.43 |
| D: Interactions | | |
| A × B | NS | NS |
| A × C | NS | NS |
| B × C | NS | NS |
| A × B × C | NS | NS |

The results shown in Table 8 indicate that addition of concentrated date syrup significantly ($p<0.05$) increases both the total solids and total carbohydrate contents of probiotic soft cream cheese. This increase is in proportion with the level of the concentration of date syrup.

The choice of *bifidobacterium* culture type did not show a significant effect on total solids and total carbohydrates. With regard to the storage period, no significant effect was found with respect to total carbohydrates. However, with regard to total solids, a storage period of over five days showed a significant increase. The increase in total solids may be due to the higher total solids of the date syrup itself.

Table 9 below shows the effect of date syrup concentration, *bifidobacterium* cultures, and storage period on fat, protein and ash contents for probiotic soft cream cheese.

TABLE 9

Effect of Date Syrup Concentration, *Bifdobacterium* Cultures and Storage Period on Fat, Total Protein and Ash Content for Probiotic Soft Cream Cheese

| Treatments | Fat % | Total Protein % | Ash % |
|---|---|---|---|
| A: Period (days) | | | |
| 0 | 14.37 b | 14.03 b | 1.048 b |
| 15 | 14.68 a | 14.27 a | 1.104 a |
| F-Test | * | * | * |
| B: Culture | | | |
| *B. infantis* | 14.47 a | 14.12 a | 1.065 a |
| *B. angulatum* | 14.58 a | 14.17 a | 1.087 a |
| F-Test | NS | NS | NS |
| C: Date Syrup Concentration (%) | | | |
| 0 | 16.20 a | 15.52 a | 0.857 e |
| 10 | 15.39 b | 14.64 b | 1.023 d |
| 15 | 14.76 c | 14.31 c | 1.079 c |
| 20 | 14.26 d | 13.97 d | 1.117 c |
| 25 | 13.66 e | 13.49 e | 1.162 b |
| 30 | 12.89 f | 12.96 f | 1.219 a |
| LSD at 5% | 0.30 | 0.19 | 0.044 |
| D: Interactions | | | |
| A × B | NS | NS | NS |
| A × C | NS | NS | NS |
| B × C | NS | NS | NS |
| A × B × C | NS | NS | NS |

Table 9 shows the fat, total protein and ash contents of the probiotic soft cream cheese. The addition of date syrup significantly decreased the fat and protein contents of the product compared to the control sample. A significant increase in ash content was also observed, both being proportionate to the date syrup concentration. The decrease in fat and protein may be explained on the basis that addition of date syrup resulted in increasing total carbohydrate contents of the products, which, in turn, caused the decrease of both fat and total proteins of the products. Similarly, the increase in ash may be the result of a relatively high ash content of date syrup itself.

Table 10 shows the effect of date syrup concentration and *bifidobacterium* cultures and on total calorie content for the probiotic soft cream cheese.

TABLE 10

Effect of Date Syrup Concentration and *Bifdobacterium* cultures on Total Calorie Content for Probiotic Soft Cream Cheese

| Treatments | Total Calories | % Increase |
|---|---|---|
| A: Culture | | |
| *B. infantis* | 246.3 a | 6.99 a |
| *B. angulatum* | 247.8 a | 7.51 a |
| F-test | NS | NS |
| B: Date Syrup Concentration (%) | | |
| 0 | 230.4 f | 0.00 f |
| 10 | 238.2 e | 3.32 e |
| 15 | 244.8 d | 6.41 d |
| 20 | 250.0 c | 8.52 c |
| 25 | 254.7 b | 10.56 b |
| 30 | 264.2 a | 14.68 a |
| LSD at 5% | 4.3 | 1.50 |
| C: Interactions | | |
| A × B | NS | NS |

As shown in Table 10, the addition of concentrated date syrup to the probiotic soft cream cheese resulted in a significant increase in the total calorie content of the product. This increase was proportional to the concentration of the added concentrated date syrup. The total calorie content was increased by 3.2, 6.0, 8.5, 10.6 and 14.7% when the concentrated date syrup was added from concentrations of 10, 15, 20, 25 and 30%, respectively.

Table 11 below shows the effect of date syrup concentration, *bifidobacterium* cultures, and storage period on pH and total acidity (as % of lactic acid) for the probiotic soft cream cheese.

TABLE 11

Effect of Date Syrup Concentration, *Bifdobacterium* Cultures and Storage Period on pH and Total Acidity (as % of Lactic Acid) for Probiotic Soft Cream Cheese

| Treatments | pH | Acidity |
|---|---|---|
| A: Period (days) | | |
| 0 | 4.596 a | 1.354 d |
| 5 | 4.575 ab | 1.412 c |
| 10 | 4.548 b | 1.472 b |
| 15 | 4.504 c | 1.547 a |
| LSD at 5% | 0.036 | 0.033 |
| B: Culture | | |
| *B. infantis* | 4.567 a | 1.441 a |
| *B. angulatum* | 4.545 a | 1.451 a |
| F-test | NS | NS |
| C: Date Syrup Concentration (%) | | |
| 0 | 4.526 b | 1.1291 e |
| 10 | 4.577 a | 1.387 d |
| 15 | 4.578 a | 1.429 c |
| 20 | 4.560 ab | 1.483 b |
| 25 | 4.560 ab | 1.531 a |
| 30 | 4.533 ab | 1.565 a |
| LSD at 5% | 0.015 | 0.040 |
| D: Interactions | | |
| A × B | NS | NS |
| A × C | NS | NS |
| B × C | NS | NS |
| A × B × C | NS | NS |

As shown in Table 11, the acidity was significantly increased in the soft cream cheese from the addition of date syrup. The acidity was found to increase correspondingly with the concentration of date syrup added. The type of *bifidobacterium* bacteria did significantly affect the acidity. However, acidity was found to increase correspondingly with increase in storage time. The results further showed that the pH values did not significantly change in the cheese with respect to differing concentrations of the date syrup. pH values were found to have a significant decrease on the fifteenth day of storage, which may be due to the stimulating effect of the higher simple sugars on the acid producing ability of the lactic acid bacteria, and may also be due to the acidic effect of the date syrup itself.

Table 12 below shows the effect of date syrup concentration, *bifidobacterium* cultures, and storage period on the *bifidobacterium*, lactic acid and total bacterial counts for the probiotic soft cream cheese.

TABLE 12

Effect of Date Syrup Concentration, *Bifdobacterium* Cultures and Storage Period on *Bifdobacterium*, Lactic Acid and Total Bacterial Counts for Probiotic Soft Cream Cheese

| Treatments | Bifidobacteria Counts $Log_{10}$ CFU/g | Lactic Acid Bacteria Counts $Log_{10}$ CFU/g | Total Bacterial Counts $Log_{10}$ CFU/g |
|---|---|---|---|
| A: Period (days) | | | |
| 0 | 9.23 a | 8.52 a | 8.646 ab |
| 5 | 9.15 ab | 8.54 a | 8.730 a |
| 10 | 8.94 bc | 8.34 b | 8.731 a |
| 15 | 8.83 c | 8.15 c | 8.528 b |
| LSD at 5% | 0.21 | 0.13 | 0.142 |
| B: Culture | | | |
| *B. infantis* | 9.05 a | 8.42 a | 8.64 a |
| *B. angulatum* | 9.02 a | 8.35 a | 8.68 a |
| F-test | NS | NS | NS |
| C: Date Syrup Concentration (%) | | | |
| 0 | 8.39 c | 7.85 c | 8.78 a |
| 10 | 9.38 a | 8.71 a | 8.63 ab |
| 15 | 9.28 a | 8.62 a | 8.69 ab |
| 20 | 9.21 a | 8.55 a | 8.69 ab |
| 25 | 9.11 ab | 8.35 b | 8.61 ab |
| 30 | 8.86 b | 8.24 b | 8.54 b |
| LSD at 5% | 0.26 | 0.16 | 0.17 |
| D: Interactions | | | |
| A × B | NS | NS | NS |
| A × C | NS | NS | NS |
| B × C | NS | * | NS |
| A × B × C | NS | NS | NS |

With regard to bifidobacteria count, the results of Table 12 show that addition of date syrup to probiotic soft cream cheese provides a significant increase in bifidobacterial counts in comparison with control samples (0% concentration). No significant difference was observed between concentrations of 10, 15, 20 and 25%. Bifidobacterial counts were 8.4, 9.4, 9.3, 9.2, 9.1 and 8.7 $\log_{10}$ CFU/g of cheese samples containing date syrup at concentrations of 0, 10, 15, 20, 25 and 30%, respectively. The type of bifidobacteria had no significant effect on the count. It should be noted that the number of the viable bifidobacterial counts for the products of all treatments was higher than the minimum concentration of probiotics required for beneficial effects up to the end of the storage period. The higher bifidobacterial counts may be due to the stimulating effects of the probiotics contained in the date syrup, particularly in the form of sugars and amino acids. Antioxidants, such as polyphenolic compounds contained within the date syrup, may also account for the probiotic bacterial growth.

The results also indicated that addition of date syrup had significant effects on lactic acid bacterial counts of the probiotic soft cream cheese. The concentrations of 10, 15 and 20% showed the highest bacterial counts, which decreased in the 25% and 30% samples. The type of *bifido* culture did not have a significant effect on lactic acid bacterial counts. There was a significant decrease in lactic acid bacterial counts of all treatments on the tenth day of the storage period. With regard to total bacterial count, the results of Table 12 indicate that the addition of date syrup with a concentration of up to 25% had no significant effect, although a significant decrease was observed at a concentration of 30% compared with the control samples. The type of *bifido* culture did not have a significant effect on the total bacterial counts. The total bacterial count did not change up to the tenth day of storage, and then showed a significant decrease at the end of the storage period. The lower total bacterial count may be due to the date syrup's stimulation of the growth of the *bifido* bacteria, which may inhibit spoilage organisms.

Coliform, mold, and yeast counts were not detected in any tested sample on the first day of production, nor during the fifteen day refrigerated storage period (at 4±1° C.). This may be attributed to the effect of the probiotic cultures, which protect the products from spoilage organisms.

Table 13 below shows the effect of date syrup concentration, *bifidobacterium* cultures, and storage period on color characteristics of the probiotic soft cream cheese. In Table 13, lightness is indicated by "L", redness is indicated by "a", and yellowness is indicated by "b".

TABLE 13

Effect of Date Syrup Concentration, *Bifdobacterium* Cultures and Storage Period on Color Characteristics for Probiotic Soft Cream Cheese

| Treatments | L | a | b | Color Exchange |
|---|---|---|---|---|
| A: Period (days) | | | | |
| 0 | 80.63 a | 2.491 a | 23.31 a | 84.35 a |
| 15 | 79.27 b | 2.521 a | 23.01 a | 82.93 a |
| F-Test | * | NS | NS | NS |
| B: Culture | | | | |
| *B. infantis* | 79.41 a | 2.479 a | 23.20 a | 83.10 a |
| *B. angulatum* | 80.49 a | 2.534 a | 23.12 a | 84.18 a |
| F-test | NS | NS | NS | NS |
| C: Date Syrup Concentration (%) | | | | |
| 0 | 90.10 a | 0.705 d | 17.65 b | 92.11 a |
| 10 | 83.10 b | 1.798 c | 21.72 ab | 86.18 b |
| 15 | 80.46 c | 2.454 b | 23.45 ab | 84.06 bc |
| 20 | 78.18 d | 2.857 b | 24.65 ab | 82.27 cd |
| 25 | 75.68 e | 3.479 a | 25.20 ab | 79.98 de |
| 30 | 72.19 f | 3.744 a | 26.29 a | 77.23 e |
| LSD at 5% | 2.03 | 0.499 | 7.08 | 2.77 |
| D: Interactions | | | | |
| A × B | NS | NS | NS | NS |
| A × C | NS | NS | NS | NS |
| B × C | NS | NS | NS | NS |
| A × B × C | NS | NS | NS | NS |

The data given in Table 13 indicate that the addition of concentrated date syrup significantly decreased the lightness (L) and color exchange of the product, and this was in proportion to the date syrup concentration. However, both values for redness (a) and yellowness (b) were significantly increased due to the addition of the date syrup. These results may be due to the natural brown color of the date syrup. It should also be noted that the type of probiotic cultures did not show significant effects on color characteristics of the cheese. Moreover, the color characteristics of the cheese did not show significant changes during the cold storage period of up to fifteen days, except for the lightness, which slightly decreased at the end of the storage period.

Table 14 below shows the effect of date syrup concentration, *bifidobacterium* cultures, and storage period on the overall sensory evaluation of the probiotic soft cream cheese. Trained panelists ranked taste, aroma, texture, appearance, color and overall acceptability for each sample, with an integer rating scale from one to nine.

TABLE 14

Effect of Date Syrup Concentration, *Bifdobacterium* Cultures and Storage Period on Sensory Evaluation for Probiotic Soft Cream Cheese

| Treatments | Taste | Aroma | Texture | Appearance | Color | Overall Acceptability |
|---|---|---|---|---|---|---|
| A: Period (days) | | | | | | |
| 0 | 7.717 a | 7.728 a | 7.850 a | 7.833 a | 7.783 a | 7.772 a |
| 5 | 7.578 a | 7.667 a | 7.761ab | 7.606 b | 7.639 a | 7.611 a |
| 10 | 7.178 a | 7.383 b | 7.606 b | 7.428 b | 7.389 b | 7.584 a |
| 15 | 7.128 a | 6.906 c | 7.028 c | 6.900 c | 6.889 c | 7.283 b |
| LSD at 5% | 0.737 | 0.223 | 0.200 | 0.206 | 0.228 | 0.207 |
| B: Culture | | | | | | |
| *B. infantis* | 7.425 a | 7.469 a | 7.628 a | 7.475 a | 7.483 a | 7.525 a |
| *B. angulatum* | 7.375 a | 7.372 a | 7.494 a | 7.408 a | 7.367 a | 7.331 b |
| F-test | NS | NS | NS | NS | NS | * |
| C: Date Syrup Concentration (%) | | | | | | |
| 0 | 7.342 a | 7.408abc | 7.508 c | 7.392 ab | 7.375 ab | 7.125 c |
| 10 | 7.667 a | 7.608 a | 7.783ab | 7.642 a | 7.558 a | 7.650 a |
| 15 | 7.700 a | 7.625 a | 7.808 a | 7.658 a | 7.617 a | 7.667 a |
| 20 | 7.417 a | 7.442 ab | 7.542bc | 7.408 ab | 7.442 ab | 7.642 a |
| 25 | 7.200 a | 7.308 bc | 7.475cd | 7.383 ab | 7.392 ab | 7.267 b |
| 30 | 7.075 a | 7.133 c | 7.250 d | 7.167 b | 7.167 b | 7.129 c |
| LSD at 5% | 0.901 | 0.097 | 0.245 | 0.253 | 0.280 | 0.090 |
| D: Interactions | | | | | | |
| A × B | NS | NS | NS | NS | NS | NS |
| A × C | NS | NS | NS | NS | NS | NS |
| B × C | NS | NS | NS | NS | NS | NS |
| A × B × C | NS | NS | NS | NS | NS | NS |

Table 14 shows the average ratings of the sensory evaluations for each sample. The data indicates that the addition of date syrup results in a significant improvement of the sensory properties of the product using both bacterial cultures. The product containing date syrup of up to 25% concentration shows significantly higher scores than those of the control samples. The highest scores for all sensory characteristics of the products appear for date syrup concentrations of 20%.

The scores for overall acceptability were 7.1, 7.6, 7.6, 7.6, 7.3 and 7.1 for the cheese containing 0, 10, 15, 20, 25 and 30% date syrup, respectively. It can be further seen that the product made using *Bifidobacterium infantis* culture showed significantly higher scores than that made using *Bifidobacterium angulation* culture for overall acceptability. Further, the cheese showed good overall acceptable quality up to the end of the fifteen day storage period.

It is to be understood that the present invention is not limited to the embodiments described above, but encompasses any and all embodiments within the scope of the following claims.

We claim:

1. A method of making a probiotic dairy product with date syrup, comprising the steps of:

adding an aqueous solution of gelatin to milk to form a first mixture that is 1% gelatin by volume;

heating the first mixture, wherein heating the first mixture is at a temperature of 85° C. for 10 minutes so as to fully hydrate the gelatin, followed by rapidly cooling the heated mixture;

adding a 2 vol % yogurt culture to the first mixture to form a yogurt mixture, wherein the 2 vol % yogurt mixed culture comprising a 1:1 ratio of *S. thermophilus* and *L. bulgaricus* to the first mixture;

adding a 5 vol % probiotic bacterium to the yogurt mixture to form a probiotic yogurt mixture, wherein the 5 vol % probiotic bacterium is selected from the group consisting of *Bifidobacterium infantis* and *Bifidobacterium anulatum;* incubating the probiotic yogurt mixture until the probiotic yogurt mixture is completely coagulated, forming a curd;

cooling the curd; and mixing the curd with 15 vol % date syrup.

2. The method of making a probiotic dairy product as recited in claim 1, wherein the step of rapidly cooling the heated first mixture comprises rapidly cooling the heated first mixture to a temperature of 40° C.

3. The method of making a probiotic dairy product as recited in claim 1, wherein the milk is fresh cow's milk having 3 vol % fat content, the method further comprising the steps of heating the fresh cow's milk to a temperature of 40° C. and adding 4 vol % skim milk powder to the heated fresh cow's milk prior to the step of adding the aqueous solution of gelatin to the milk.

4. The method of making a probiotic dairy product as recited in claim 1, wherein the milk is powdered milk, the method further comprising the step of reconstituting whole milk powder in a water having a temperature of 40° C. to form milk having 15 vol % solids, said step of adding the aqueous solution of gelatin further comprising heating the reconstituted milk to 60° C. and adding the gelatin.

5. A method of making a probiotic dairy product with date syrup, comprising the steps of:

heating a volume of milk;

adding 4 vol % skim milk powder to the heated volume of milk to form a first mixture;

heating the first mixture, wherein the heating is at a temperature of 85° C. for 10 minutes, followed by rapidly cooling the heated first mixture;

adding a 0.5 vol % culture to the first mixture to form a cultured mixture, wherein the 0.5 vol % mixed culture comprises a 1:1 ratio of *S. thermophilus* and *L. bulgaricus* to the first mixture;

adding a 5 vol % probiotic bacterium to the cultured mixture to form a probiotic cultured mixture, wherein the probiotic bacterium is selected from the group consisting of *Bifidobacterium infantis* and *Bifidobacterium anulatum;* incubating the probiotic cultured mixture until the probiotic cultured mixture is completely coagulated, forming a curd;

cooling the curd;

mixing the curd with pasteurized fresh cream in a curd-to-pasteurized fresh cream volume ratio of 80:20 to form a soft cream cheese; and mixing the soft cream cheese with 15 vol % pasteurized date syrup so that the gelatin forms about 0.75 vol % of the probiotic dairy product.

6. The method of making a probiotic dairy product as recited in claim 5, wherein the step of heating the volume of milk comprises heating a volume of fresh cow's milk having 3 vol % fat to a temperature of 40° C.

7. The method of making a probiotic dairy product as recited in claim 5, wherein the step of rapidly cooling the heated first mixture comprises rapidly cooling the heated first mixture to a temperature of 40° C.

8. The method of making a probiotic dairy product as recited in claim 5, wherein the step of incubating the probiotic cultured mixture comprises incubating the probiotic cultured mixture at a temperature of 37° C.

9. The method of making a probiotic dairy product as recited in claim 5, wherein the step of cooling the curd comprises refrigerating the curd at a temperature between 3° C. and 5° C. for a period of 24 hours.

* * * * *